US009642000B2

(12) United States Patent
Wager et al.

(10) Patent No.: US 9,642,000 B2
(45) Date of Patent: *May 2, 2017

(54) METHOD AND ARRANGEMENT IN A TELECOMMUNICATIONS NETWORK (71) Applicant: Telefonaktiebolaget LM Ericsson (publ), Stockholm (SE)

(72) Inventors: Stefan Wager, Espoo (FI); Mats Folke, Luleå (SE); Stefan Wänstedt, Luleå (SE); Henning Wiemann, Aachen (DE); Emre Yavuz, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/861,695

(22) Filed: Sep. 22, 2015

(65) Prior Publication Data
US 2016/0014593 A1 Jan. 14, 2016

Related U.S. Application Data (63) Continuation of application No. 13/701,666, filed as application No. PCT/SE2012/051107 on Oct. 15, 2012, now Pat. No. 9,179,290.
(Continued)

(51) Int. Cl.
*H04W 4/00* (2009.01)
*H04W 8/14* (2009.01)
(Continued)

(52) U.S. Cl.
CPC .............. *H04W 8/14* (2013.01); *H04W 8/08* (2013.01); *H04W 64/006* (2013.01);
(Continued)

(58) Field of Classification Search
CPC ........ H04W 88/02; H04W 4/02; H04W 88/06
(Continued)

(56) References Cited

U.S. PATENT DOCUMENTS

2007/0287476 A1* 12/2007 Jeong .................... H04W 76/02
455/456.6
2010/0035633 A1* 2/2010 Park ...................... H04W 60/04
455/456.1
(Continued)

OTHER PUBLICATIONS

Unknown, Author. "Enhanced Mobility State Estimation and Reporting." Potevio. 3GPP TSG-RAN WG2 Meeting #78. R2-122356. Prague, Czech Republic. May 21-25, 2012. 1-3.
(Continued)

*Primary Examiner* — Nghi H Ly
(74) *Attorney, Agent, or Firm* — Murphy, Bilak & Homiller, PLLC (57) ABSTRACT Methods and apparatus for improving the reporting of mobility information are disclosed. An example method, suitable for implementation in a mobile terminal such as an LTE UE, begins with the detecting of a transition from idle state to connected state. The mobile terminal subsequently transmits mobility information to the network in response to or in connection with the transition. The mobility information sent to the network includes one or more of several information elements or information types, including a list of recently visited cells, including information specifying a time-of-stay in each cell, or timestamp information that can be used to derive the mobile terminal's time in each cell. GPS-based speed information or other generic speed information may be included. Complementary methods for implementation in a base station and corresponding apparatus are also disclosed.

21 Claims, 4 Drawing Sheets

Related U.S. Application Data (60) Provisional application No. 61/679,136, filed on Aug. 3, 2012.

(51) Int. Cl.
*H04W 64/00* (2009.01)
*H04W 76/04* (2009.01)
*H04W 8/08* (2009.01)
*H04W 36/32* (2009.01)
*H04W 48/20* (2009.01)

(52) U.S. Cl.
CPC .......... *H04W 76/046* (2013.01); *H04W 36/32* (2013.01); *H04W 48/20* (2013.01)

(58) Field of Classification Search
USPC ............. 455/422.1, 414.1, 404.2, 456.1, 441
See application file for complete search history.

(56) References Cited

U.S. PATENT DOCUMENTS

| | | | |
|---|---|---|---|
| 2011/0034152 A1* | 2/2011 | Khouri | H04M 3/5235 455/413 |
| 2011/0130141 A1 | 6/2011 | Frost et al. | |
| 2012/0281672 A1* | 11/2012 | Ohm | H04B 7/185 370/331 |
| 2014/0057625 A1* | 2/2014 | Wager | H04W 76/046 455/422.1 |

OTHER PUBLICATIONS

Unknown, Author. "Mobility State Estimation Consideration." Ericsson, ST-Ericsson. 3GPP TSG-RAN WG2 #77bis. Tdoc R2-121416. Jeju Island, Republic of Korea. Mar. 25-30, 2012. 1-4.

Unknown, Author. "On Improvements to Mobility State Estimation Procedure." Renesas Electronics Europe Ltd. 3GPP TSG-RAN WG2 Meeting #77bis. R2-121669. Jeju, South Korea. Mar. 26-30, 2012. 1-6.

Unknown, Author. "Summary of email discussion [77bis#25] LTE/ EDDA: Assistance Information." Nokia Corporation (Email discussion rapporteur). 3GPP TSG-RAN WG2 Meeting #78. R2-122512. Prague, Czech Republic. May 21-25, 2012. 1-21.

Unknown, Author, "3rd Generation Partnership Project; Technical Specification Group Radio Access Network; Evolved Universal Terrestrial Radio Access (E-UTRA); Radio Resource Control (RRC); Protocol specification (Release 10)," 3GPP TS 36.331 V10.6.0, Jun. 2012, 1-302.

Unknown, Author, "Summary of email discussion [77#33] LTE: Mobility State Estimation Enhancements", Renesas Mobile Europe Ltd. (Email discussion rapporteur), 3GPP TSG-RAN WG2 #77bis, R2-121850, Jeju, Korea, Mar. 26-30, 2012, 1-22.

\* cited by examiner

METHOD AND ARRANGEMENT IN A TELECOMMUNICATIONS NETWORK

RELATED APPLICATIONS

The present application is a continuation of U.S. patent application Ser. No. 13/701,666, filed 3 Dec. 2012, which was a national stage entry under 35 U.S.C. §371 of international patent application serial no. PCT/SE2012/051107, filed 15 Oct. 2012, which claimed the benefit of U.S. provisional application Ser. No. 61/679,136, filed 3 Aug. 2012. The entire contents of each of these applications are incorporated herein by reference.

BACKGROUND

The $3^{rd}$ Generation Partnership Project (3GPP) is continuing its work of specifying the Evolved Universal Terrestrial Radio Access Network (E-UTRAN), which consists of the Long Term Evolution (LTE) and System Architecture Evolution (SAE) concepts. In the RAN2 working group, a Study Item on Heterogeneous Network (HetNet) mobility enhancements is ongoing as part of the development of the Release 11 specifications for LTE.

With HetNets, the existing homogeneous network is overlaid with additional lower-power, low-complexity base stations. This approach is expected to mitigate the cost and/or capacity limitations of macro densification and base station upgrades. However, one of the challenges with HetNets is a need to revise the existing mobility procedures for LTE networks to optimize system performance.

A focus area in these efforts to improve mobility procedures for HetNets involves speed estimation, i.e., methods to determine the speed of a particular mobile terminal (a "user equipment" or "UE," in 3GPP terminology, but often referred to interchangeably as mobile terminal, mobile station, wireless terminal, etc.). According to the current specifications for LTE networks, speed estimation can be determined either in the UE or on the network side. These techniques are referred to herein as "UE-based speed estimation" and "network-based speed estimation," respectively.

UE-Based Speed Estimation

Mobility State Estimation (MSE) is a concept whereby the UE counts the number of handovers or cell reselections during a particular period of time. MSE can be performed by UEs in both Radio Resource Control (RRC) connected state and in idle mode. In RRC connected state, the MSE can be used to scale certain mobility measurement related parameters. For instance, if so configured by the network, the UE can scale the timeToTrigger parameter of the A3 event, based on the UE mobility state detection. (See the 3GPP document "Radio Resource Control (RRC) Protocol Specification," 3GPP TS 36.331, v. 10.6.0, July 2012, available at www.3gpp.org.")

Figure 1:
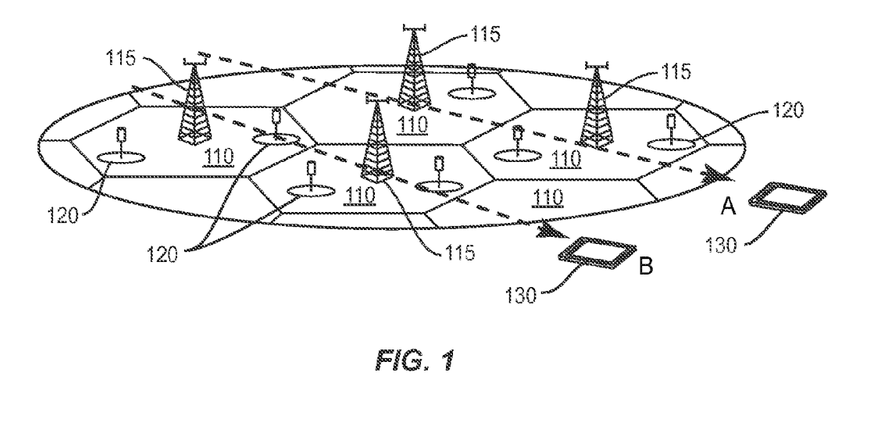
FIG. 1 illustrates alternate paths taken by mobile terminals in a heterogeneous mobile communications network.

MSE was originally designed to work in homogeneous network deployments. In heterogeneous network deployments, however cells may have widely varying sizes, which mean that UEs moving at the same speed through a given network deployment may get different handover counts, depending on which route they take. This can be seen in FIG. 1, for example, which illustrates a number of macro cells 110, each served by a macro base station 115, overlaid by a number of small cells 120. Assuming that both of the pictured UEs 130 detect both macro cells and small cells as they travel through pictured area, UE A will get a lower handover count (3) than UE B (7) for the pictured routes, even if they move at identical speeds and travel similar distances.

Several proposals have been made regarding how UE-based Mobility State Estimation could be improved to work better in heterogeneous network deployments with varying cell sizes. However, there are a number of issues with UE-based MSE that should be considered. First, common to most proposals is that cell sizes are somehow taken into account when calculating the mobility state. Of course, for this to be done the UE must be informed of cell sizes. This would increase the signaling effort from the network to the UE, and any gain from knowing cell size must be compared with this increased signaling effort. Second, cell size information as standardized now is not accurate and precise enough. This is different for network-based speed estimation, where Operations, Administration, and Maintenance (OAM) configuration can be used to enhance the granularity of this information. Third, the cell shape also affects the MSE. For instance, higher macro cell sectorization will affect the MSE, but the cell is still a macro cell. Again, this would not be apparent to the UE, but could be known at the network level. Finally, Cell Range Expansion will also affect the cell size and thus the MSE.

Network Based Speed Estimation

On the network side, knowledge of the UE speed is an important input to the handover decision, e.g., in order to avoid handover of fast moving UEs to small cells. UE History Information is exchanged between eNBs when a UE is performing handover. More particularly, the Information Element (IE) UE History Information contains information about cells that a UE has been served by, in active state, prior to being handed over to the target cell. The information about the cells includes Global Cell Id, Cell Type (Large, Medium, Small, Very Small) and the time the UE stayed in each cell.

Using this information, the network can form a rough estimate of the UE speed. The estimate can be improved by considering also more detailed information about the cells, such as deployment, position, transmit power, antenna configuration.

To allow further improvements in network side speed estimation, it has been proposed to enhance the Last Visited Cell parameter in the UE History Information IE by adding a more generic speed estimate in kilometers/hour, e.g., in the same format as in a Radio Link Failure (RLF) report. Once a generic format for informing the mobility history between eNBs is available, however, the details of the speed estimation process will be left to network implementation.

Network-based speed estimation only works for UEs that are connected to the network, i.e., in RRC connected state. UEs not connected to the network, i.e., those UEs in idle state, will not report cell changes to the network. As a result, the network has no knowledge of the number of cell borders crossed by idle mode UEs. One challenge for network-based speed estimation is that UEs can frequently move between idle and connected states. This can be the case, for example, with smartphones that are occasionally sending small, isolated packets, with longer duration of inactivity between transmissions. For these users, a problem that arises as a result is that the network cannot gather enough handover statistics for a reliable speed estimate.

SUMMARY

As noted above, network-based speed estimation only works for UEs that are connected to the network, i.e., in RRC connected state. UEs not connected to the network, i.e., in idle state, will not report cell changes to the network, and thus the network has no knowledge of the number of cell borders crossed by the UE. For UEs frequently changing from connected to idle state and back again, one problem is that the network will never be able to gather enough handover statistics for a reliable speed estimate. Accordingly, improved procedures for estimating a UE's speed are needed.

To address the problem of inaccuracy of the UE-based MSE on transition from idle to connected, a UE configured according to several embodiments of the present invention adds additional information to an RRC message, such as an RRC connection establishment message, to inform the network of its speed. This additional information includes one or more of the following, in various embodiments of the invention:

1. A list of recently visited cells, including information specifying a time-of-stay in each cell, or timestamp information that can be used to derive the UE's time in each cell. The network can use this information to initialize the handover based speed estimation.
2. GPS (Global Positioning System) based speed information. Many UEs have an integrated GPS receiver that can provide accurate speed information if enabled.
3. Generic speed information, independent of the source.

An example method for improving mobility reporting information, implemented in a mobile terminal operating in a wireless communication network, begins with the detecting of a transition from idle state to connected state. The mobile terminal subsequently transmits mobility information to the network in response to or in connection with the transition. The mobility information sent to the network includes one or more of a variety of information elements, including any of the additional information types summarized above.

In some cases the mobile terminal receives configuration data from the wireless communication network prior to transmitting the mobility information. This configuration data specifies a format for reporting the mobility information, or a number of cells to report, or both.

In some embodiments, at least some of the mobility information transmitted to the base station is included in a message requesting an establishment of a Radio Resource Control (RRC) connection with the wireless communication network. In an LTE network, for example, all or part of the mobility information may be sent in an RRCConnectionRequest message. In some embodiments, at least some of the mobility information may be sent in a message indicating a completion of a setup of an RRC connection with the wireless communication network, such as in an RRCConnectionSetupComplete message in an LTE network. In still other embodiments, all or part of the mobility information sent to the base station may be included in a message sent as part of an RRC reconfiguration procedure, e.g., as part of an RRCConnectionReconfigurationComplete message.

Any of the preceding embodiments may further include assembling the mobility information by forming a mobility report that includes information identifying last-visited cells for the mobile terminal. In some cases, the mobile terminal is configured to limit the number of cells identified to a pre-determined number, or to limit the cells identified to those visited within a certain time before the report is formed, or both. In some of these embodiments, the mobile terminal omits the very last visited cell from the mobility report. In some of these and in other embodiments, the mobility report may include information indicating a time stayed in each identified cell, or one or more time stamps for each identified cell, from which a time stayed in each identified cell can be calculated, or both.

In any of the preceding embodiments, the transmitted mobility information may include speed information obtained from a GPS receiver or other Global Navigation Satellite System (GNSS) receiver. The transmitted mobility information may include a generic information element that carries speed information determined from at least one of Doppler measurements, Wi-Fi positioning solutions, and other local-area positioning technologies. In some embodiments, the transmitted mobility may also include a list of cells detected, but not visited, by the mobile terminal, and corresponding time stamp information for each cell.

Complementary methods suitable for implementation in a base station, such as an LTE eNodeB, are also described in detail below. An example method begins with an optional transmission of configuration information to the mobile terminal, the configuration data specifying a format for reporting the mobility information, or specifying a number of cells to report, or both. The method continues with the receiving of mobility information transmitted by a mobile terminal in response to or in connection with a transition from idle state to connected. The mobility information may include any of the information elements and/or information types summarized above and described in detail below. The method continues with the base station determining an initial speed estimate for the mobile terminal, based on the received information.

In some of these embodiments, at least some of the mobility information is received in a message requesting an establishment of an RRC connection with the wireless communication network. In some embodiments, all or part of the mobility information is received in a message indicating a completion of a setup of an RRC connection with the wireless communication network. This information may be received in an RRCConnectionSetupComplete message, for example. Likewise, some or all of the mobility information may be received in a message sent as part of an RRC reconfiguration procedure.

Embodiments of the invention also include mobile terminal apparatus comprising processing circuits configured with appropriate software to carry out the methods summarized above or variants thereof, as well as corresponding base station apparatus.

BRIEF DESCRIPTION OF THE DRAWINGS

Examples of embodiments herein are described in more detail with reference to attached drawings in which.

Of course, embodiments herein are not limited to the above features and advantages. Indeed, those skilled in the art will recognize additional features and advantages upon reading the following detailed description, and upon viewing the accompanying drawings.

DETAILED DESCRIPTION

For illustrative purposes, several embodiments of the present invention will be described in the context of a Long-Term Evolution (LTE) system. Those skilled in the art will appreciate, however, that several embodiments of the present invention may be more generally applicable to other wireless communication systems, including, for example, WiMax (IEEE 802.16) systems.

In the discussion that follows, a base station is frequently described as an eNodeB or eNB, which are 3GPP terms for an LTE base station, while mobile terminals may be referred to as "user equipment" or "UEs." It should be understood that this use of 3GPP terminology is non-limiting and that other base stations and mobile terminals could be used. The techniques described herein may be applied to other types of communication systems, including systems other than those standardized by 3GPP. Likewise, the mobile terminals referred to herein could correspond to any of various types of devices adapted for use in such systems, including cellular telephones, smartphones, PDAs, or laptop computers, for example.

As discussed above, network-based speed estimation only works for UEs that are connected to the network, i.e., in RRC connected state. UEs not connected to the network, i.e., in idle state, will not report cell changes to the network, and thus the network has no knowledge of the number of cell borders crossed by the UE. For UEs frequently changing from connected to idle state and back again, one problem is that the network will never be able to gather enough handover statistics for a reliable speed estimate.

UEs in idle mode can perform Mobility State Estimate (MSE) as specified in chapter 5.2.4.3 of the 3GPP document "Evolved Universal Terrestrial Radio Access (E-UTRA); User Equipment (UE) procedures in idle mode," 3GPP TS 36.304, v. 10.6.0 (July 2012), available at www.3gpp.org. Thus, one solution to the problem mentioned above could be for the UE to transmit its idle mode MSE to the eNodeB upon transition from idle to active. This would give the network an initial view of the mobility state for the UE, and would also permit an initial estimate of the UE's speed, until a more accurate determination of the UE's mobility can be performed. However, with this approach the mobility state estimate calculated by the UE again suffers from the inaccuracies described in the background discussion above. For instance, because the UE does not know the size of the cells it moves through, the network's initial estimate of the UE speed will suffer poor accuracy in a heterogeneous deployment.

Various embodiments of the present invention address these problems by sending additional information from UE to the network to inform the network of the UE's speed. This additional information, referred to as "mobility information" in the discussion that follows, is sent at or in response to the UE's transition from idle state to connected state. The types of mobility information that might be sent are discussed in further detail below.

Figure 2:
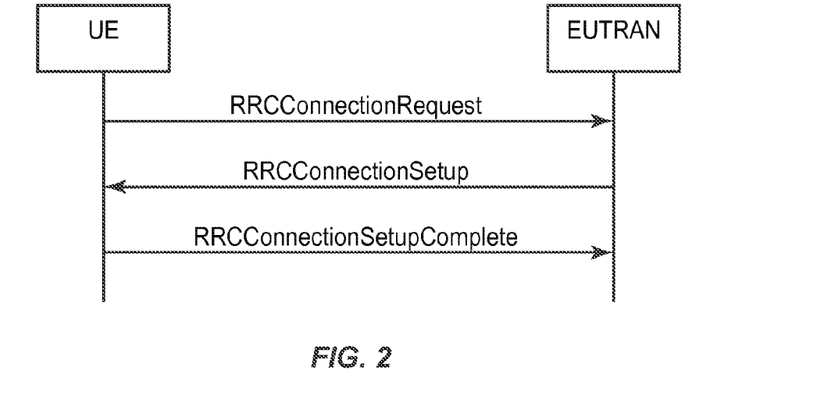
FIG. 2 illustrates an example RRC connection establishment procedure.

An RRC connection establishment procedure in the context of the Enhanced Universal Terrestrial Access Network (EUTRAN; the formal name for the LTE network) is shown in FIG. 2. As can be seen in the figure, the UE initiates the procedure by sending an RRCConnectionRequest message. The network responds (via an eNB) with an RRCConnectionSetup message. The UE completes the procedure with an RRCConnectionSetupComplete message.

In some embodiments of the invention, the mobility information sent by the UE to the network is included in the RRCConnectionRequest message, which is thus modified relative to the current standards. In others, the mobility information is sent in a modified RRCConnectionSetupComplete message.

It will be appreciated that there are several advantages to sending the information in the RRCConnectionSetupComplete message. One advantage is that this message is transmitted with RLC acknowledged mode and is less restricted in size. Further, using RRCConnectionSetupComplete message also allows the network to configure the format of the reported list, e.g., how many cells to report. Thus, some embodiments adapted to send the information via the RRCConnectionSetupComplete message are also adapted to receive configuration data from the network, prior to sending the RRCConnectionSetupComplete message, the configuration data specifying the format of the report and/or the number of cells to report, or some combination of both.

Figure 3:
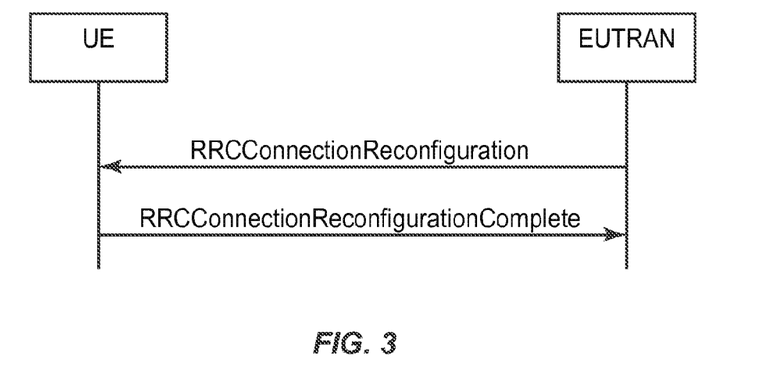
FIG. 3 illustrates an example RRC connection reconfiguration procedure.

In other embodiments, the mobility information is transmitted by the UE to the network during a RRC connection reconfiguration procedure, rather than during a RRC connection establishment. An example reconfiguration procedure is shown at FIG. 3. The network first sends an RRCConnectionReconfiguration message to initiate the procedure. The UE responds with an RRCConnectionReconfigurationComplete message. The additional mobility information can be sent as part of a modified RRCConnectionReconfigurationComplete message shown in FIG. 3.

It should be noted that the approaches described above are not mutually exclusive, but can be coupled together. Also, various alternatives for additional mobility information to be sent by the UE, compared to existing standards, are discussed below. Again, it should be appreciated that these alternatives are not mutually exclusive, but can be combined in various embodiments of the present invention.

Last-Visited (or Recently Visited) Cells Information

One example of the mobility information that might be sent according to the techniques described above is a mobility report that includes information regarding the last-visited (i.e., most recently visited) cells for the UE. For example, several (e.g., 16) last-visited cells including time of stay in each cell might be identified. An alternative is to include in this report information regarding the cells visited within a certain time before the report is formed. A variant of this alternative is to put a limit on the number of cells reported, e.g., up to 16 of the most-recently visited cells within a given time frame.

The information reported for the visited cells is similar to that in the UE History Information IE that is used by the eNodeB on the X2 interface at connected mode handover. For details, see chapter 9.2.38 of the 3GPP document "Evolved Universal Terrestrial Radio Access Network (E-UTRAN); X2 application protocol (X2AP)," 3GPP TS 36.423, v. 10.5.0(March 2012), available at www.3gpp.org.

There are several differences in the information reported by the UE, however, in various embodiments. For example, one difference is that the UE will not be able to include information about the cell type. The cell type includes information about cell size (large, medium, small, very small). However, a smart network implementation will be able to deduce this information from the reported cell id.

Another difference is that the very last visited cell needs different treatment than in the X2 case. In the X2 case, the very last visited cell is the cell prior to the handover to the target cell, and the time of stay reflects the time stayed in that cell, from entering it until leaving it. However, in the case of idle to active transition, the very last visited cell could be the cell in which the UE performs the idle to active transition, so that the time stayed in that cell reflects the time from entering the cell until transmitting the RRC connection request message. There are at least two different ways to handle this. One approach is for the UE to include the very last visited cell in the mobility report. When determining the UE speed, the network takes into consideration that the corresponding time spent in that cell does not reflect the time spent moving through the entire cell. One motivation for this approach is that it gives the most recent information of UE movement. Thus it may give an indication of a sudden change of the UE speed, even if the UE did not yet traverse the whole cell. A second approach is for the UE to deliberately omit the very last visited cell from the report, since it has not yet traversed the whole cell.

Table 1 illustrates some details of an example format for the last-visited cell information that might be sent by the UE according to the techniques described above. This format is similar to that specified for the eNB-to-eNB report for last-visited cell information, but with the "Cell Type" field removed.

TABLE 1

Last Visited Cell Information

| IE/Group Name | Presence | Range | IE type and reference | Semantics description |
|---|---|---|---|---|
| Global Cell ID | M | | ECGI 9.2.14 | |
| Time UE stayed in Cell | M | | INTEGER (0 . . . 4095) | The duration of the time the UE stayed in the cell in seconds. If the UE stays in a cell more than 4095 s, this IE is set to 4095 |

GPS-Based Speed Information

Many UEs have an integrated GPS receiver that can provide accurate speed information if enabled. The additional mobility information described above may include this speed information, in some embodiments of the present invention. Transmitting this information to the eNB will aid the network based speed estimation function. One difference between GPS-based information and the list of last visited cells is that the GPS information provides additional useful information for the network even in the event that the UE is in connected mode for some time. Accordingly, in some embodiments of the invention this information is also transmitted in RRC-connected state.

One suitable format for transmitting this speed information from the UE to the eNB is the Information Element (IE) LocationInfo which is already defined in the RRC specification "Radio Resource Control (RRC) Protocol Specification," 3GPP TS 36.331, v. 10.6.0 (July 2012), available at www.3gpp.org. The IE LocationInfo is used to transfer detailed location information available at the UE to correlate measurements and UE position information.

The part of the LocationInfo IE that includes the speed information is the horizontal Velocity. Horizontal Velocity is defined in the 3GPP document "Evolved Universal Terrestrial Radio Access (E-UTRA); LTE Positioning Protocol (LPP)," 3GPP TS 36.355, v. 10.5.0 (July 2012), available at www.3gpp.org, and includes a bearing parameter (an integer from 0 to 359, representing an angular for the UE's motion) and a horizontalSpeed parameter. This information tells the speed of the UE movement and can be used, for example, to initialize a speed estimation function in the network. Note that the bearing information tells the direction of the UE movement and can be used by the network to predict future handover needs.

The GPS-based speed information to be sent from the UE to eNB in various embodiments of the present invention could be either the full locationInfo or just horizontalSpeed. It should be noted that since the GPS receiver consumes a lot of power, it will not be enabled at all times. Thus, sending the Horizontal Velocity IE is optional, i.e., only provided when the information is available.

Generic Speed Information

In some embodiments of the invention, a generic information element for the speed information is defined. This generic information element is independent of the source of the speed information. Thus, the UE can use any of several means for determining its speed, such as Doppler measurements. Other possibilities include Wi-Fi positioning solutions, especially when the UE is indoors, or other local-area positioning technologies.

To encourage widespread UE implementation, there should be no requirements on the accuracy of the speed estimate. Of course, the network should also take this into consideration when using the speed estimate.

Note that on the network side, the option for the source eNB to send a generic speed information element to target eNB at handover has been mentioned as part of the Mobility Robustness Optimization (MRO) Study Item Technical Report in Rel-11 [RAN3 X2 spec].

Time Stamp

Another technique that can be combined with the previously described techniques is to add time stamps for each visited cell, each time stamp reflecting the absolute time at which a cell reselection took place. This time stamp information can be provided in addition to the "time stayed in cell" information, or instead of it. From this information, the network can calculate the time stayed in each cell, as well as the time from entering a certain cell until arriving at the current location. That would, however, require also a common time reference.

Measured Cells

The UE may also include a list of cells that it has detected, but not visited, including a time stamp. For instance, the network may have configured the UE to measure for cells on another frequency or representing another radio access technology, e.g. WLAN, and the UE may report the results of such measurements.

Indoor Positioning

There are some UE applications (e.g. http://www.skyhookwireless.com) that can derive positioning information from used or measured WiFi access point. The additional mobility information relayed to the eNB can include this positioning information, in some embodiments, in which case the network can use the information input to a network based speed estimation function.

Figure 4:
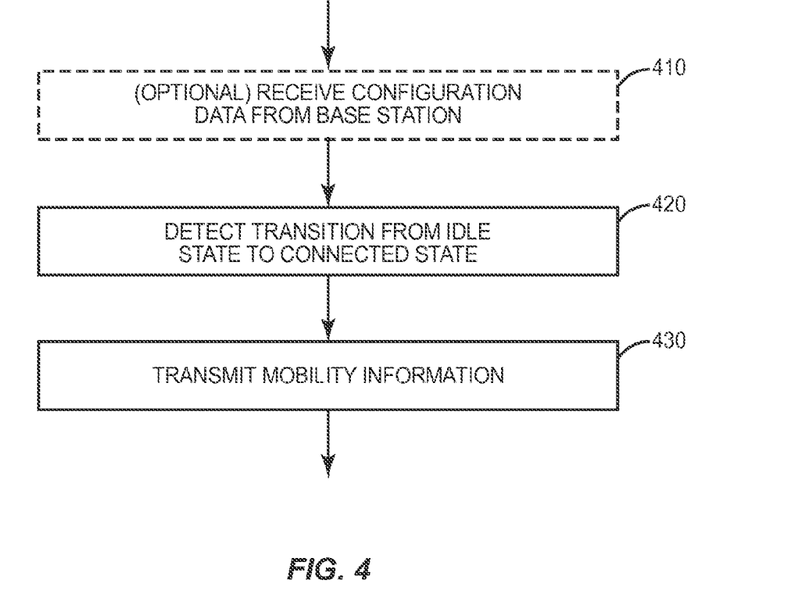
FIG. 4 is a process flow diagram illustrating an example method, in a mobile terminal, for improving mobility reporting.

Embodiments of the present invention thus include methods for improving the reporting of mobility information. An example method, suitable for implementation in a mobile terminal such as an LTE UE, is illustrated in FIG. 4. As shown at block 420 (block 410 will be discussed below), the illustrated method includes the detecting of a transition from idle state to connected state. As shown at block 430, the mobile terminal subsequently transmits mobility information to the network in response to or in connection with the transition. The mobility information sent to the network includes one or more of the information elements and/or information types described above.

As suggested above, in some cases the mobile terminal receives configuration data from the wireless communication network prior to transmitting the mobility information. This configuration data specifies a format for reporting the mobility information, or a number of cells to report, or both. This step, illustrated at block 410 of FIG. 4, may not appear in all embodiments and/or may not be used every time the additional mobility information is sent, however. For that reason, this step is illustrated as "optional" in the process flow diagram of FIG. 4.

In some embodiments, at least some of the mobility information transmitted to the base station is included in a message requesting an establishment of a Radio Resource Control (RRC) connection with the wireless communication network. In an LTE network, for example, all or part of the mobility information may be sent in an RRCConnectionRequest message. In some embodiments, at least some of the mobility information may be sent in a message indicating a completion of a setup of an RRC connection with the wireless communication network, such as in an RRCConnectionSetupComplete message in an LTE network. In still other embodiments, all or part of the mobility information sent to the base station may be included in a message sent as part of an RRC reconfiguration procedure, e.g., as part of an RRCConnectionConfigurationComplete message.

Any of the preceding embodiments may further include assembling the mobility information by forming a mobility report that includes information identifying last-visited cells for the mobile terminal. In some cases, the mobile terminal is configured to limit the number of cells identified to a pre-determined number, or to limit the cells identified to those visited within a certain time before the report is formed, or both. In some of these embodiments, the mobile terminal omits the very last visited cell from the mobility report. In some of these and in other embodiments, the mobility report may include information indicating a time stayed in each identified cell, or one or more time stamps for each identified cell, from which a time stayed in each identified cell can be calculated, or both.

In any of the preceding embodiments, the transmitted mobility information may include speed information obtained from a GPS receiver or other Global Navigation Satellite System (GNSS) receiver. The transmitted mobility information may include a generic information element that carries speed information determined from at least one of Doppler measurements, Wi-Fi positioning solutions, and other local-area positioning technologies. In some embodiments, the transmitted mobility may also include a list of cells detected, but not visited, by the mobile terminal, and corresponding time stamp information for each cell.

Figure 5:
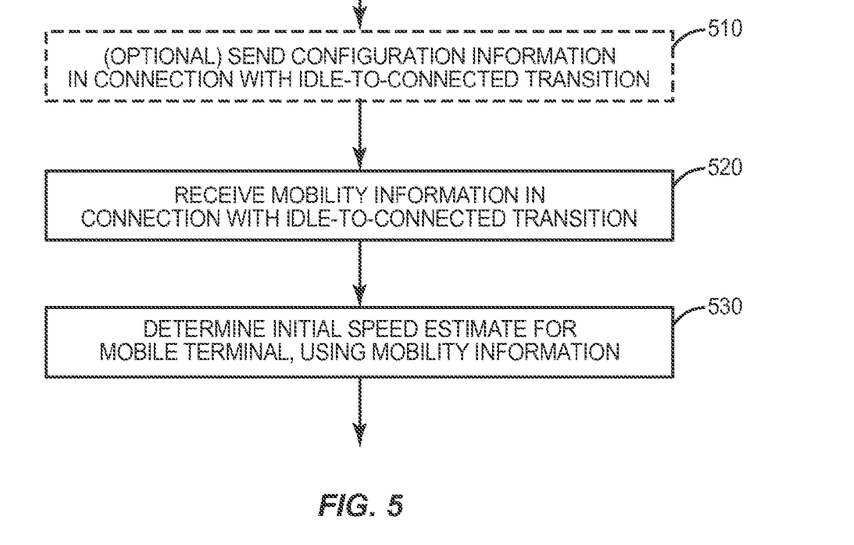
FIG. 5 is a process flow diagram illustrating an example method, in a base station, for improving mobility reporting.

While FIG. 4 illustrated a generalized method suitable for implementation in a mobile terminal, the process flow diagram of FIG. 5 shows a complementary method suitable for implementation in a base station, such as an LTE eNodeB.

As shown at block 510, the illustrated method optionally begins with the transmission of configuration information to the mobile terminal, the configuration data specifying a format for reporting the mobility information, or specifying a number of cells to report, or both. As discussed above in connection with the process flow diagram of FIG. 4, this operation may not appear in all embodiments of the invention or in every instance the method is performed. For this reason, the step is illustrated as "optional" in FIG. 5.

As shown at block 520, the method continues (or begins, if the operation shown in block 510 is omitted) with the receiving of mobility information transmitted by a mobile terminal in response to or in connection with a transition from idle state to connected. The mobility information may include any of the information elements and/or information types described above. The method continues with the base station determining an initial speed estimate for the mobile terminal, based on the received information, as shown at block 530.

In some embodiments, at least some of the mobility information is received in a message requesting an establishment of an RRC connection with the wireless communication network. In some embodiments, all of part of the mobility information is received in a message indicating a completion of a setup of an RRC connection with the wireless communication network. This information may be received in an RRCConnectionSetupComplete message, for example. Likewise, some or all of the mobility information may be received in a message sent as part of an RRC reconfiguration procedure.

Figure 6:
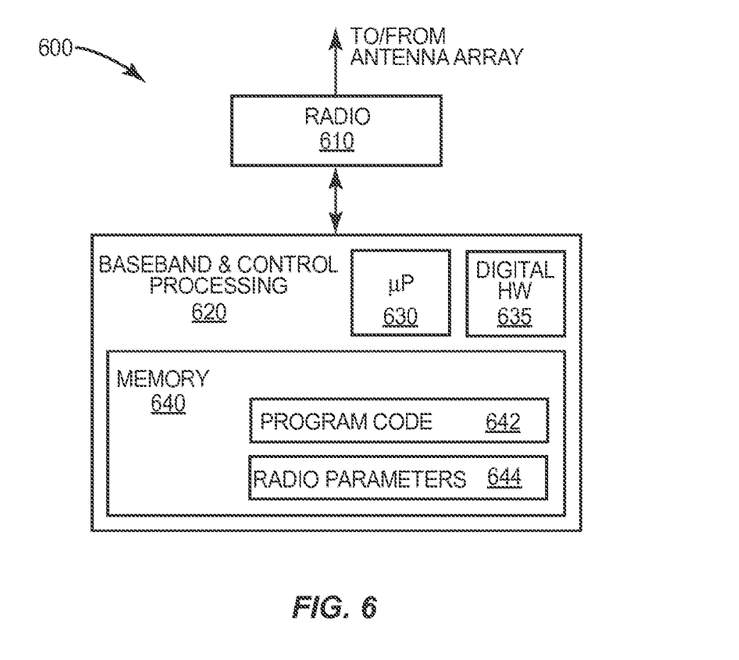
FIG. 6 is a block diagram illustrating components of an example mobile terminal.

Those skilled in the art will appreciate that some of the methods and techniques described above will be implemented in a wireless transceiver apparatus such as the one pictured in FIG. 6, which illustrates a few of the components relevant to the present techniques, as realized in a mobile terminal, such as an LTE UE.

The pictured apparatus includes radio circuitry 610 and baseband & control processing circuit 620. Radio circuitry 610 includes receiver circuits and transmitter circuits that use known radio processing and signal processing components and techniques, typically according to a particular telecommunications standard such as the 3GPP standards for LTE. Because the various details and engineering tradeoffs associated with the design of such circuitry are well known and are unnecessary to a full understanding of the invention, additional details are not shown here.

Baseband & control processing circuit 620 includes one or more microprocessors or microcontrollers 630, as well as other digital hardware 635, which may include digital signal processors (DSPs), special-purpose digital logic, and the like. Either or both of microprocessor(s) 630 and digital hardware may be configured to execute program code 642 stored in memory 640, along with radio parameters 644. Again, because the various details and engineering tradeoffs associated with the design of baseband processing circuitry for mobile devices are well known and are unnecessary to a full understanding of the invention, additional details are not shown here.

The program code 642 stored in memory circuit 640, which may comprise one or several types of memory such as read-only memory (ROM), random-access memory, cache memory, flash memory devices, optical storage devices, etc., includes program instructions for executing one or more telecommunications and/or data communications protocols, as well as instructions for carrying out one or more of the techniques described herein, in several embodiments. Radio parameters 644 may include one or more predefined parameters.

Accordingly, in various embodiments of the invention, processing circuits, such as the baseband & control processing circuits 620 of FIG. 6, are configured to carry out one or more of the above-described techniques described above, in particular the techniques illustrated generally in FIG. 4 and described in detail above. Likewise, other embodiments include a control processing circuit configured to carry out one or more of these techniques. In some cases, these processing circuits are configured with appropriate program code, stored in one or more suitable memory devices, to implement one or more of the techniques described herein. Thus, for instance, an example mobile terminal according to some embodiments of the invention includes a radio unit and a processing unit, where the processing unit is arranged to detect a transition for the mobile terminal from idle state to connected state, and to transmit mobility information to a base station in the wireless communication network, using the radio unit, in response to or in connection with the detected transition. Of course, it will be appreciated that not all of the steps of these techniques are necessarily performed in a single microprocessor or even in a single module.

Figure 7:
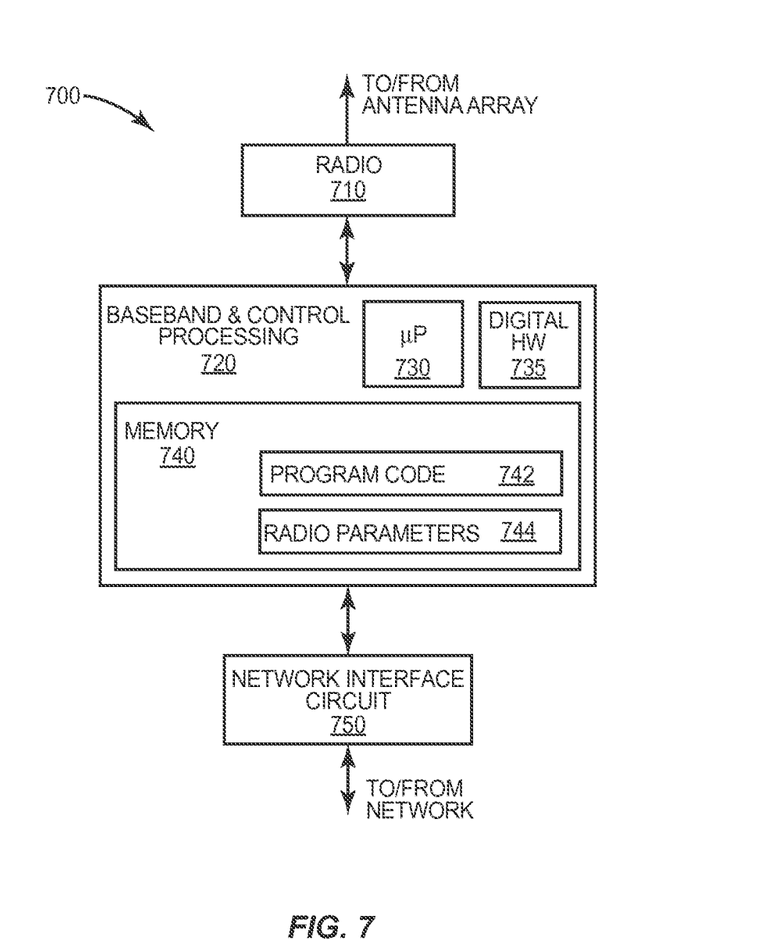
FIG. 7 is a block diagram illustrating components of an example base station.

Similarly, several of the techniques described above can be implemented in a base station, such as an eNodeB in a 3GPP wireless network. FIG. 7 is a block diagram illustrating some components of one possible base station, illustrating just a few of the components relevant to the present techniques. It will be appreciated that several aspects of the pictured network node correspond to similar features of FIG. 6, although those skilled in wireless system design will appreciate that the detailed design of these components will vary as these components are adapted for base station or mobile terminal use.

The pictured apparatus includes radio circuitry 710 and baseband & control processing circuit 720. Radio circuitry 710 includes receiver circuits and transmitter circuits that use known radio processing and signal processing components and techniques, typically according to one or more particular telecommunications standards such as the 3GPP specifications for LTE. Because the various details and engineering trade-offs associated with the design and implementation of such circuitry are well known and are unnecessary to a full understanding of the invention, additional details are not shown here.

Baseband & control processing circuit 720 includes one or more microprocessors or microcontrollers 730, as well as other digital hardware 735, which may include digital signal processors (DSPs), special-purpose digital logic, and the like. Either or both of microprocessor(s) 730 and digital hardware may be configured to execute program code 742 stored in memory 740, along with radio parameters 744. Again, because the various details and engineering tradeoffs associated with the design of baseband/control processing circuitry for wireless base stations and other network nodes are well known and are unnecessary to a full understanding of the invention, additional details are not shown here.

Transmitting apparatus 700 further includes a network interface circuit 750, which is configured for communication with other nodes in the wireless network. In an eNodeB in particular, this network interface circuit is configured to communicate with other nodes using the X2 interface defined by 3GPP specifications.

The program code 742 stored in memory circuit 740, which may comprise one or several types of memory such as read-only memory (ROM), random-access memory, cache memory, flash memory devices, optical storage devices, etc., includes program instructions for executing one or more telecommunications and/or data communications protocols, as well as instructions for carrying out one or more of the techniques described herein, in several embodiments. Radio parameters 744 include various predetermined configuration parameters as well as parameters determined from system measurements and the like.

Accordingly, in various embodiments of the invention, processing circuits, such as the baseband & control processing circuits 720 of FIG. 7 are configured to carry out one or more of the above-described techniques for improving mobility reporting information, in particular the techniques illustrated generally in FIG. 5 and described in detail above. Likewise, other embodiments include a control processing circuit configured to carry out one or more of these techniques. In some cases, these processing circuits are configured with appropriate program code, stored in one or more suitable memory devices, to implement one or more of the techniques described herein. Thus, for instance, an example base station according to some embodiments of the invention includes a radio unit and a processing unit, where the processing unit is arranged to receive, via the radio unit, mobility information transmitted by a mobile terminal in response to or in connection with a transition from idle state to connected, and to determine an initial speed estimate for the mobile terminal, based on the received mobility information. Of course, it will be appreciated that not all of the steps of these techniques are necessarily performed in a single microprocessor or even in a single module.

Examples of several embodiments of the present invention have been described in detail above, with reference to the attached illustrations of specific embodiments. Because it is not possible, of course, to describe every conceivable combination of components or techniques, those skilled in the art will appreciate that the present invention can be implemented in other ways than those specifically set forth herein, without departing from essential characteristics of the invention. Modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation. The present embodiments are thus to be considered in all respects as illustrative and not restrictive.

REFERENCES

The following references specify details of the underlying protocols and message formats referred to in the preceding discussion, should be considered an integral part of the present disclosure. The most recent published versions of these references as of the filing date of the present application are hereby incorporated by reference herein.

[1] 3GPP TS 36.331, "Radio Resource Control (RRC) Protocol Specification"
[2] 3GPP TS 36.423, "Evolved Universal Terrestrial Radio Access Network (E-UTRAN); X2 application protocol (X2AP)"
[3] 3GPP TR 36.300, Evolved Universal Terrestrial Radio Access (E-UTRA) and Evolved Universal Terrestrial Radio Access Network (E-UTRAN); Overall description; Stage 2
[4] 3GPP TS 36.304, "Evolved Universal Terrestrial Radio Access (E-UTRA); User Equipment (UE) procedures in idle mode"
[5] 3GPP TS 36.355, "Evolved Universal Terrestrial Radio Access (E-UTRA); LTE Positioning Protocol (LPP)"

What is claimed is:

1. A method for improving mobility reporting information, implemented in a mobile terminal operating in a wireless communication network, the method comprising: detecting a transition for the mobile terminal from idle state to connected state; and transmitting mobility information to a base station in the wireless communication network, in response to or in connection with the detected transition, wherein said mobility information includes an estimate of a speed for the mobile terminal or information that can be used to estimate a speed for the mobile terminal, when the mobile terminal is nonstationary, and wherein at least some of the mobility information is transmitted in a message indicating a completion of a setup of a Radio Resource Control connection with the wireless communication network.

2. The method of claim 1, wherein transmitting mobility information to the base station further comprises including at least some of the mobility information in a message requesting an establishment of a Radio Resource Control connection with the wireless communication network.

3. The method of claim 1, further comprising receiving configuration data from the wireless communication network prior to transmitting the mobility information, the configuration data specifying a format for reporting the mobility information, or specifying a number of cells to report, or both.

4. The method of claim 1, wherein transmitting mobility information to the base station further comprises including at least some of the mobility information in a message sent as part of a Radio Resource Control reconfiguration procedure.

5. The method of claim 1, further comprising including, in the transmitted mobility information, speed information obtained from a Global Positioning System (GPS) receiver or other Global Navigation Satellite System (GNSS) receiver.

6. The method of claim 1, wherein the transmitted mobility information includes a generic information element that carries speed information determined from at least one of Doppler measurements, Wi-Fi positioning solutions, and other local-area positioning technologies.

7. The method of claim 1, wherein the transmitted mobility information further includes positioning information from one or more used or measured Wi-Fi access points.

8. A method for improving mobility reporting information, implemented in a base station operating in a wireless communication network, the method comprising: receiving mobility information transmitted by a moving mobile terminal in response to or in connection with a transition from idle state to connected state, said mobility information including an estimate of a speed for the mobile terminal or information that can be used to estimate a speed for the moving mobile terminal, wherein at least some of the mobility information is received in a message indicating a completion of a setup of a Radio Resource Control connection with the wireless communication network; determining an initial speed estimate for the mobile terminal, based on the received mobility information.

9. The method of claim 8, wherein the method further comprises receiving at least some of the mobility information in a message requesting an establishment of a Radio Resource Control connection with the wireless communication network.

10. The method of claim 8, further comprising transmitting configuration data to the mobile terminal prior to receiving the mobility information, the configuration data specifying a format for reporting the mobility information, or specifying a number of cells to report, or both.

11. The method of claim 8, wherein the method further comprises receiving at least some of the mobility information in a message sent as part of a Radio Resource Control reconfiguration procedure.

12. A mobile terminal adapted for operation in a wireless communication network, the mobile terminal comprising: a radio unit; and a processing unit; wherein the processing unit is configured to: detect a transition for the mobile terminal from idle state to connected state; and transmit mobility information to a base station in the wireless communication network, using the radio unit, in response to or in connection with the detected transition, wherein said mobility information includes at least one of an estimate of a speed for the mobile terminal, or information that can be used to estimate a speed for the mobile terminal, when the mobile terminal is nonstationary, and wherein at least some of the mobility information is included in a message indicating a completion of a setup of a Radio Resource Control connection with the wireless communication network.

13. The mobile terminal of claim 12, wherein the processing unit is further configured to include at least some of the mobility information in a message requesting an establishment of a Radio Resource Control connection with the wireless communication network.

14. The mobile terminal of claim 12, wherein the processing unit is further configured to receive configuration data from the wireless communication network prior to transmitting the mobility information, the configuration data specifying a format for reporting the mobility information, or specifying a number of cells to report, or both.

15. The mobile terminal of claim 12, wherein the processing unit is further configured to include at least some of the mobility information in a message sent as part of a Radio Resource Control reconfiguration procedure.

16. The mobile terminal of claim 12, further comprising a Global Positioning System (GPS) receiver or other Global Navigation Satellite System (GNSS) receiver, wherein the processing unit is further arranged to include, in the transmitted mobility information, speed information obtained from the GPS receiver or other GNSS receiver.

17. The mobile terminal of claim 12, wherein the processing unit is further configured to include, in the mobility report, a generic information element that carries speed information determined from at least one of Doppler measurements, Wi-Fi positioning solutions, and other local-area positioning technologies.

18. A base station adapted for operation in a wireless communication network, the base station comprising: a radio unit; and a processing unit; wherein the processing unit is configured to: receive, via the radio unit, mobility information transmitted by a moving mobile terminal in response to or in connection with a transition from idle state to connected state, said mobility information including an estimate of a speed for the mobile terminal or information that can be used to estimate a speed for the mobile terminal, wherein at least some of the mobility information is received in a message indicating a completion of a setup of a Radio Resource Control connection with the wireless communication network; determine an initial speed estimate for the mobile terminal, based on the received mobility information.

19. The base station of claim 18, wherein the processing unit is further configured to receive at least some of the mobility information in a message requesting an establishment of a Radio Resource Control connection with the wireless communication network.

20. The base station of claim 18, wherein the processing unit is further configured to send configuration data to the mobile terminal prior to receiving the mobility information, the configuration data specifying a format for reporting the mobility information, or specifying a number of cells to report, or both.

21. The base station of claim 18, wherein the processing unit is further configured to receive at least some of the mobility information in a message sent as part of a Radio Resource Control reconfiguration procedure.

* * * * *